US010556553B2

(12) United States Patent
Kasarla et al.

(10) Patent No.: US 10,556,553 B2
(45) Date of Patent: Feb. 11, 2020

(54) VEHICLE CAMERA MOUNTING INTERFACES

(71) Applicant: Veoneer US, Inc., Southfield, MI (US)

(72) Inventors: Nagender Reddy Kasarla, New Hudson, MI (US); Suresh Boddi, New Hudson, MI (US); Gustav Alm, Linköping (SE); Karl Munsin, Linköping (SE)

(73) Assignee: Veoneer US, Inc., Southfield, MI (US)

( * ) Notice: Subject to any disclaimer, the term of this patent is extended or adjusted under 35 U.S.C. 154(b) by 29 days.

(21) Appl. No.: 15/980,600

(22) Filed: May 15, 2018

(65) Prior Publication Data
US 2019/0351840 A1 Nov. 21, 2019

(51) Int. Cl.
| *B60R 11/04* | (2006.01) |
| *B60R 11/02* | (2006.01) |
| *H04N 5/225* | (2006.01) |
| *B60R 11/00* | (2006.01) |

(52) U.S. Cl.
CPC .......... *B60R 11/04* (2013.01); *B60R 11/0211* (2013.01); *H04N 5/2252* (2013.01); *B60R 2011/0049* (2013.01); *B60R 2011/0059* (2013.01); *B60R 2011/0084* (2013.01)

(58) Field of Classification Search
None
See application file for complete search history.

(56) References Cited

U.S. PATENT DOCUMENTS

| 4,027,841 | A | * | 6/1977 | Sturtevant | G02B 7/00 248/346.01 |
| 5,702,389 | A | * | 12/1997 | Taylor | A61B 17/62 606/56 |
| 6,400,516 | B1 | * | 6/2002 | Spinali | G02B 7/023 359/818 |
| 6,420,975 | B1 | * | 7/2002 | DeLine | B60R 1/12 340/425.5 |
| 9,193,308 | B2 | | 11/2015 | Okuda | |
| 9,487,156 | B2 | | 11/2016 | Frenzel et al. | |

(Continued)

FOREIGN PATENT DOCUMENTS

KR 101084749 11/2011

OTHER PUBLICATIONS

Korean Patent Application KR101084749, dated Nov. 22, 2011, Machine Translation.
(Continued)

*Primary Examiner* — William B Perkey
(74) *Attorney, Agent, or Firm* — Matthew D. Thayne; Thayne & Davis LLC

(57) ABSTRACT

Vehicle camera assemblies comprising novel mounting interfaces. In some embodiments, the assembly may comprise a camera housing configured for being mounted to a vehicle having a plurality of protruding coupling members extending therefrom. Each of the plurality of protruding coupling members may comprise a curved surface that may, for example, define curves in two planes perpendicular to one another. The assembly may further comprise a bracket configured for being coupled with the camera housing. The bracket may comprise a plurality of clips configured to releasably receive the plurality of protruding coupling members to releasably couple the camera housing to the bracket.

19 Claims, 9 Drawing Sheets

(56) References Cited

U.S. PATENT DOCUMENTS

| | | | |
|---|---|---|---|
| 9,862,332 B2 | 1/2018 | Okuda | |
| 2002/0088916 A1* | 7/2002 | March | B60R 1/04 |
| | | | 248/549 |
| 2005/0231969 A1* | 10/2005 | Fogg | B60Q 1/2665 |
| | | | 362/494 |
| 2010/0065707 A1 | 3/2010 | Hansel | |
| 2011/0096427 A1* | 4/2011 | Uken | B60R 1/04 |
| | | | 359/872 |
| 2012/0119973 A1* | 5/2012 | Ahring | F41H 5/26 |
| | | | 343/882 |
| 2014/0373423 A1 | 12/2014 | Teetzel et al. | |
| 2016/0069506 A1* | 3/2016 | Shelef | F16M 11/041 |
| | | | 403/221 |
| 2016/0119516 A1 | 4/2016 | Clearman | |
| 2017/0240120 A1 | 8/2017 | Krug et al. | |
| 2017/0274836 A1 | 9/2017 | Kasai et al. | |
| 2019/0193649 A1* | 6/2019 | Kataishi | B60R 11/04 |

OTHER PUBLICATIONS

Jul. 24, 2019 PCT/US19/32316 International Search Report (2 pgs).
Jul. 24, 2019 PCT/US19/32316 Written Opinion (7 pgs).

* cited by examiner

VEHICLE CAMERA MOUNTING INTERFACES

SUMMARY

Disclosed herein are various embodiments of mounting interfaces and related assemblies, such as vehicle camera assemblies, that may be used to facilitate mounting of vehicle cameras or other components, particularly components that may benefit from a reliable means for repeatedly mounting and dismounting for various purposes such as cleaning, service, etc.

Numerous structures exist for mounting vehicle cameras, sensors, and the like. However, known mounting interfaces are typically difficult to install, mount, and/or dismount. Indeed, they often require tools, sometimes specialized tools, in order to mount and/or dismount the camera. In addition, many existing solutions may be prone to untimely failure, such as limited ability to withstand repeated mounting/dismounting, limited ability to withstand vehicle jolts and vibrations, and/or limited ability to hold, position, and/or reposition a camera or other vehicle sensor in a variety of different scenarios.

The present inventors have therefore determined that it would be desirable to provide systems and methods that overcome one or more of the foregoing limitations and/or other limitations of the prior art. Thus, in some embodiments, the inventive concepts disclosed herein may be used to provide an interface assembly that allows a user to snap-fit a camera, another sensor, or another component, particular vehicle components, in place, preferably without specialized tools and preferably in a manner that allows for dismounting, preferably by manual force in a single direction.

In a more particular example of a vehicle camera assembly according to some embodiments, the assembly may comprise a camera configured for being coupled to a vehicle, a bracket configured for being coupled with the camera, a camera mounting interface positioned on the camera, and a bracket mounting interface positioned on the bracket. Preferably at least one of the bracket mounting interface and the camera mounting interface comprises a plurality of coupling members, such as protruding coupling members, configured for facilitating a desired coupling between the camera and the bracket. At least one of the camera mounting interface and the bracket mounting interface (the interface lacking the coupling members) may comprise a plurality of clips configured to releasably receive the plurality of coupling members to releasably couple the camera to the bracket. In preferred embodiments, at least a portion of each of the protruding coupling members may define, at least in part, an at least substantially spherical surface. In some such embodiments, the at least substantially spherical surface may comprise a hemispherical surface.

In some embodiments, each of the plurality of coupling members comprises a first hemispherical surface, each of the plurality of clips comprises a groove defining opposing flat surfaces. Each of the grooves may be configured to receive a respective coupling member so as to result in contact between the at least substantially spherical surface and the two opposing flat surfaces. In some embodiments, each of the grooves comprises a V-shaped groove. In some embodiments, each of the grooves and/or coupling members is configured to provide for contact in exactly two spots.

In some embodiments, each of the plurality of clips may further comprise a resiliently deformable prong positioned opposite from the V-shaped groove such that a slot for receiving a coupling member is formed between the resiliently deformable prong and the V-shaped groove. In some such embodiments, each of the resiliently deformable prongs may comprise a protruding lip configured to lock a coupling member within the slot.

In some embodiments, each of the protruding coupling members may further comprise a second hemispherical surface. In embodiments comprising a protruding lip or other stop feature, the second hemispherical (or otherwise at least substantially spherical) surface may be configured to contact the protruding lip or other stop feature as the coupling member is disengaged from the slot.

Preferably, the clips are wholly defined by either the bracket or the camera housing/assembly. Thus, in some embodiments, each of the plurality of clips comprises a groove and a resiliently deformable prong positioned opposite from the groove, and each of the plurality of clips may be wholly defined on either the camera or the bracket. In some embodiments, the camera assembly and/or housing may be configured such that the camera may be snap-fit into the clips on the bracket using only the protruding coupling members on the camera assembly and/or housing and the clips to which the coupling members are engaged as the sole coupling means. In other words, in some embodiments, no external clips, snaps, hooks, screws, bolts, or other coupling means may be needed for such embodiments in order to securely couple and/or uncouple the camera from the bracket.

In another example of a vehicle camera assembly according to other embodiments, the assembly may comprise a camera housing configured for being mounted to a vehicle. The camera housing may house a vehicle camera. The camera housing may further comprise a plurality of protruding coupling members. Each of the plurality of protruding coupling members may comprise a curved surface defining curves in two planes perpendicular to one another. In some embodiments, the curved surface may comprise an at least substantially spherical surface. In some such embodiments, the curved surface may comprise a hemispherical surface. The vehicle camera assembly may further comprise a bracket configured for being coupled with the camera housing. The bracket may comprise a plurality of clips configured to releasably receive the plurality of protruding coupling members to releasably couple the camera housing to the bracket.

In some embodiments, each of the plurality of clips may comprise a groove configured to receive a respective protruding coupling member such that the curved surface of the respective protruding coupling member contacts the groove. In some such embodiments, each of the plurality of clips may comprise a groove configured to receive a respective protruding coupling member such that the curved surface of the respective protruding coupling member contacts the groove in exactly two locations. In some such embodiments, the groove may comprise a V-shaped groove.

In some embodiments, each of the plurality of clips may further comprise a prong, such as a plate, positioned opposite from the groove so as to define a slot for receiving a protruding coupling member therein. The plate may comprise a resiliently-deformable plate configured to allow a protruding coupling member to deform the plate to allow the protruding coupling member to be received in the slot in a snap-fit manner.

In some embodiments, the prong/plate may comprise a protruding lip configured to lock a protruding coupling member in a slot defined by the plate and a groove.

In yet another example of a vehicle camera assembly according to still other embodiments, the assembly may comprise a camera configured for being coupled to a vehicle and a bracket configured for being coupled with the camera. A camera mounting interface may be positioned on the camera. A bracket mounting interface may be positioned on the bracket. At least one of the bracket mounting interface and the camera mounting interface may comprise a plurality of coupling members and the opposite interface may comprise a plurality of clips configured to releasably receive the plurality of coupling members to releasably couple the camera to the bracket. In some embodiments, the camera mounting interface and the bracket mounting interface may be configured to constrain each of six degrees of freedom of movement of the camera relative to the bracket.

The camera mounting interface and the bracket mounting interface may also, or alternatively, be configured to provide for a snap-in configuration whereby the camera can be engaged to the bracket without use of specialized tools. In some such embodiments, the camera mounting interface and the bracket mounting interface may be configured to provide for a snap-in configuration whereby the camera can be engaged to the bracket by hand and without use of any tools.

In some embodiments, the at least one of the bracket mounting interface and the camera mounting interface may comprise exactly three coupling members. In some embodiments, each of the three coupling members may comprise an at least substantially spherical surface.

In some embodiments, each of the plurality of clips may comprise a V-shaped groove. In some such embodiments, the camera mounting interface and the bracket mounting interface may be configured to provide exactly six points of contact between the at least substantially spherical surfaces of the coupling members and the V-shaped grooves of the clips.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to apparatus and systems for mounting components, particularly for mounting components, such as cameras, sensors, and the like, to vehicles. In some embodiments, the inventive principles disclosed herein may be used to provide a snap-fit coupling between a mounting bracket and a camera, sensor, or other vehicle component.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
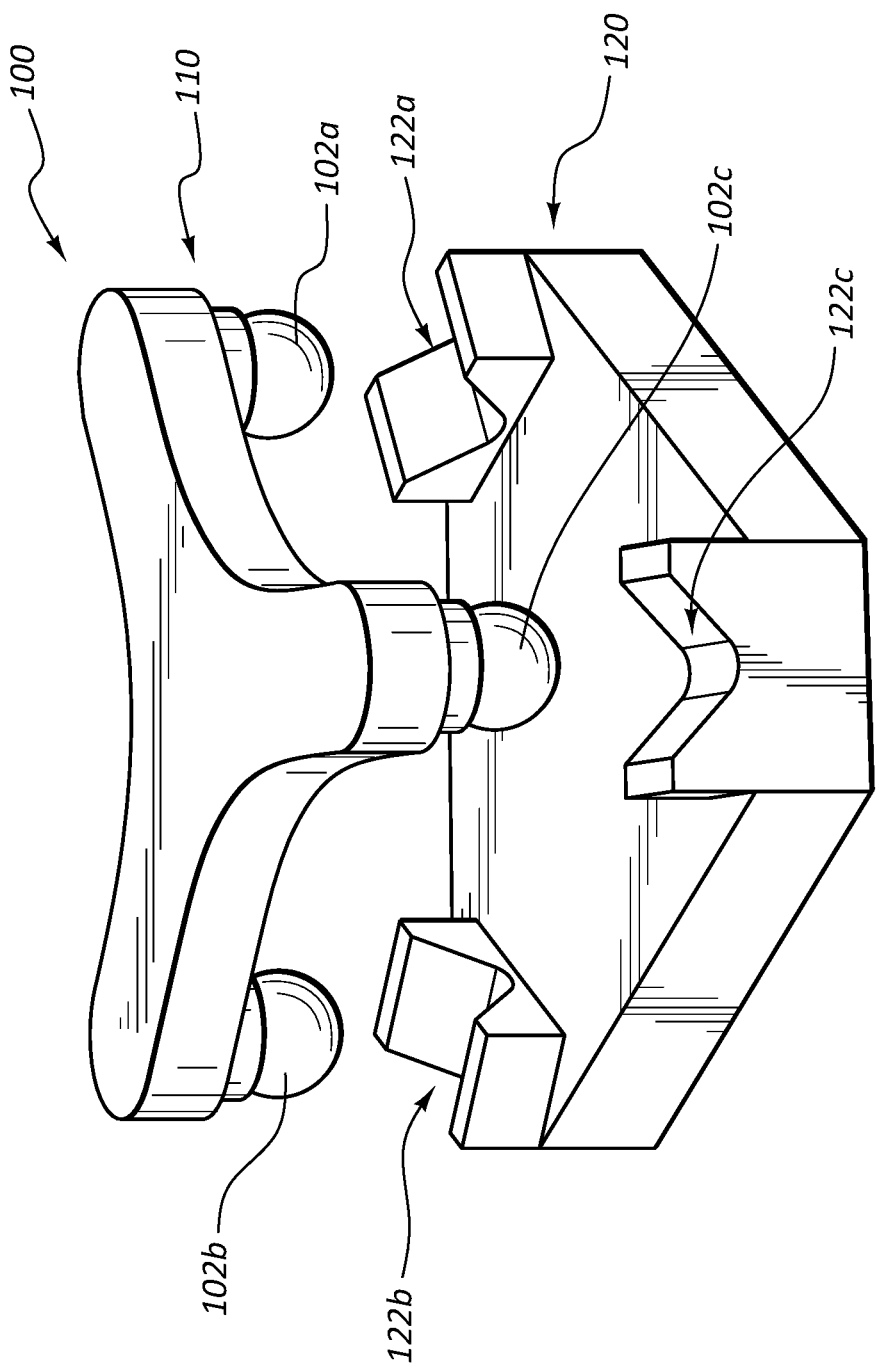
FIG. 1 is a perspective view of certain aspects of a coupling interface according to some embodiments.

FIG. 1 is a perspective view depicting a portion of a coupling interface 100 that may be used for a vehicle camera assembly. Coupling interface 100 comprises a first mounting interface 110 and a second mounting interface 120. In preferred embodiments, mounting interface 110 may be coupled with a vehicle camera, such as on a housing of a vehicle camera, and mounting interface 120 may be part of a vehicle camera mounting bracket. However, it is contemplated that mounting interfaces 110 and 120 may be reversed in other embodiments such that mounting interface 110 is part of a bracket and mounting interface 120 is part of a camera and/or camera housing or assembly.

As shown in FIG. 1, mounting interface 110 is defined by three coupling members, each of which defines, at least in part, an at least substantially spherical surface. Each of these spherical coupling members 102 is configured to be received in a respective groove 122 of mounting interface 120. More particularly, coupling member 102a is configured to contact and engage groove 122a, coupling member 102b is configured to contact and engage groove 122b, and coupling member 102c is configured to contact and engage groove 122c.

Each groove 122 comprises a V-shaped groove comprising two opposing flat surfaces extending at an angle relative to one another. In the depicted embodiment, a lower portion of each groove 122 forms a rounded portion that connects the two flat surfaces. However, in other embodiments, these two flat surfaces may directly intersect one another so as to form a sharpened edge therebetween. Preferably, spherical coupling members 102 are configured to contact a respective groove 122 so that only two points of contact are possible between each respective coupling member 102 and its corresponding groove 122 (one on each opposing surface defining the V shape). In this manner, exactly six points of contact may be provided between the spherical coupling members 102 and the grooves 122, which may be used to precisely constrain each of the six degrees of freedom of a device, such as a vehicle camera, being mounted using the coupling interface 100. This may allow for repeated coupling and decoupling of a vehicle camera or other device, preferably in a snap-fit manner. Preferably, this coupling can be performed without any specialized tool by simply snapping the two coupling interfaces together. In some such embodiments, this coupling can be performed by hand, again, preferably in a snap-fit manner, without the use of any tools whatsoever.

Figure 2:
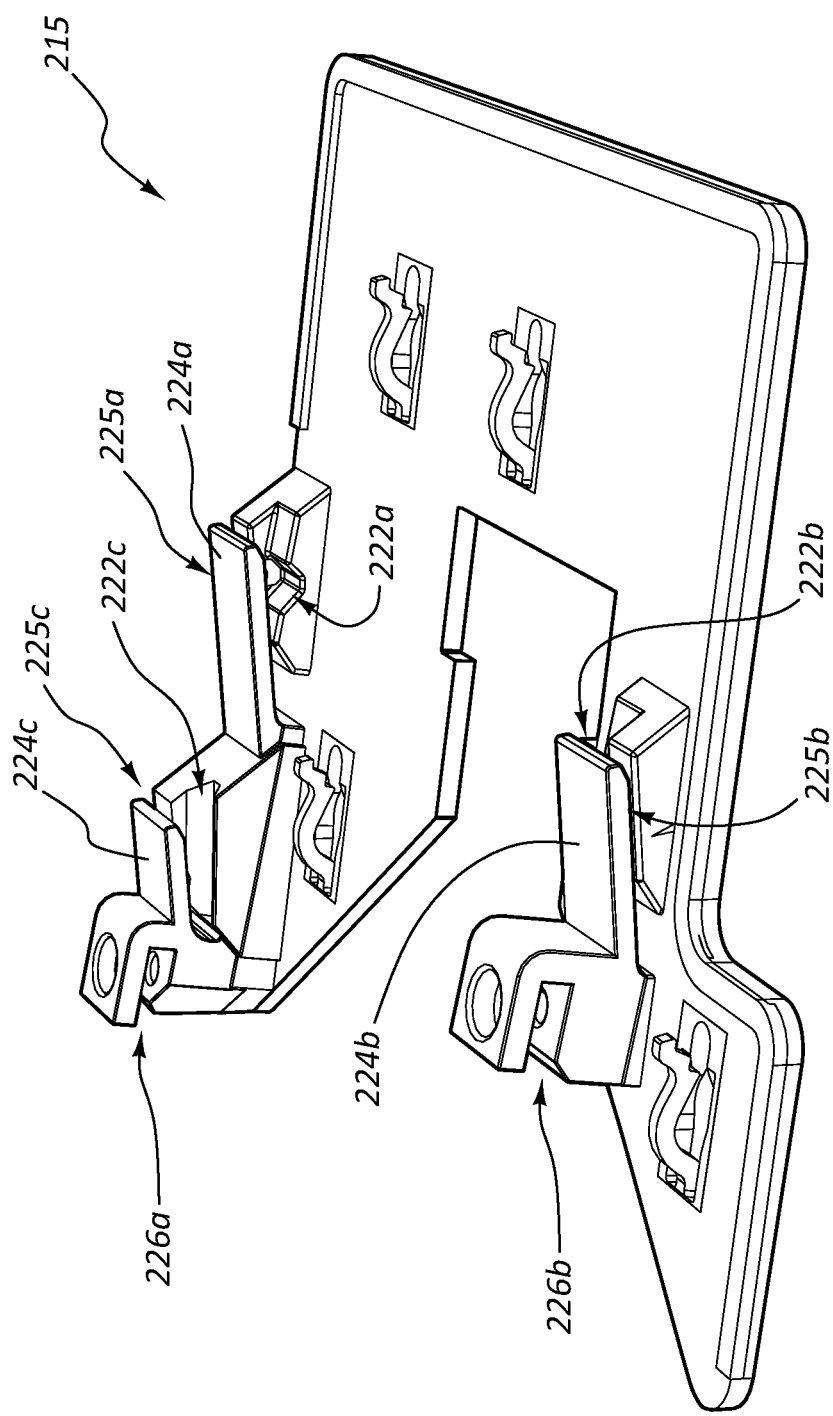
FIG. 2 is a first perspective view of a mounting bracket according to some embodiments.

FIG. 2 is a perspective view of a mounting bracket 215 for mounting a vehicle camera to a vehicle according to some embodiments. Bracket 215 comprises a plurality of clips each defining a slot for receiving a coupling member therein, such as a coupling member of a camera and/or camera housing, as discussed in greater detail below. More particularly, bracket 215 comprises a first clip 225a defined by a v-shaped groove 222a and a resiliently deformable prong 224a defining a first slot therebetween, a second clip 225b defined by a v-shaped groove 222b and a resiliently deformable prong 224b defining a second slot therebetween, and a third clip 225c defined by a v-shaped groove 222c and a resiliently deformable prong 224c.

As shown in the figure, one of the clips, namely, clip 225c, comprises a v-shaped groove 222c that extends in a direction angled relative to the other two clips. More particularly, in the depicted embodiment, clip 225c extends at an at least substantially perpendicular angle relative to the other two clips 225a and 225b. This may allow for constraining translational motion along to perpendicular planes. More particularly, clips 225a and 225b may be used to control, for example, translation of the camera in fore and aft directions, whereas clips 225c may be used to control translation of the camera in a direction perpendicular to those associated with clips 225a and 225b.

As also shown in FIG. 2, one or more of the aforementioned slots may comprise openings on two sides to allow respective coupling members to be slidably received from one side during mounting and extend from a vehicle camera, camera housing, or other structure from a second side, as discussed in greater detail below. In addition, each of these slots preferably engages a respective coupling member in a snap-fit manner. This may be accomplished, at least in part, by providing one or more resiliently flexible components. For example, in the depicted embodiment, one or more of the prongs 224, which in the figures are shown in the shape of plates, may be pivotably or otherwise flexibly coupled to allow a coupling member to temporarily displace prongs 224 during mounting and/or dismounting.

As previously mentioned, each of the grooves 222 preferably comprises a V-shaped groove having two opposing, flat surfaces that extend at an angle relative to one another. In some embodiments, including the embodiment depicted in FIG. 2, the two flat surfaces need not directly contact each other and instead may be connected by a curved surface or another flat surface extending therebetween.

As also previously mentioned, preferably slots 225 are configured such that coupling members having a curved surface, preferably an at least partially spherical (including hemispherical) surface, may contact the two opposing flat surfaces of grooves 222 at exactly two points. As discussed in greater detail below, in some embodiments another surface of one or more of slots 225 opposing groove 222, such as the lower surface of a respective plate 224, may also contact the coupling member. In some embodiments, a lip or other stop feature may be used to facilitate a more secure engagement and/or prevent unwanted loosening and/or disengagement between the various engagement members and their respective grooves, clips, and/or slots.

One or more means for coupling with another component, such as the means for coupling bracket 215 with a light trap shown at 226a and 226b in FIG. 2, may be provided. Elements 226a and 226b comprise slots configured to receive a portion of a light trap, such as light trap 230 (see FIG. 7) to facilitate engagement with the light trap 230. As shown in FIG. 2, holes may be formed in slots 226a and/or 226b and in a corresponding feature of light trap 230, to allow for receipt of a bolt, screw, or other fastener therein to provide a more secure coupling.

Figure 3:
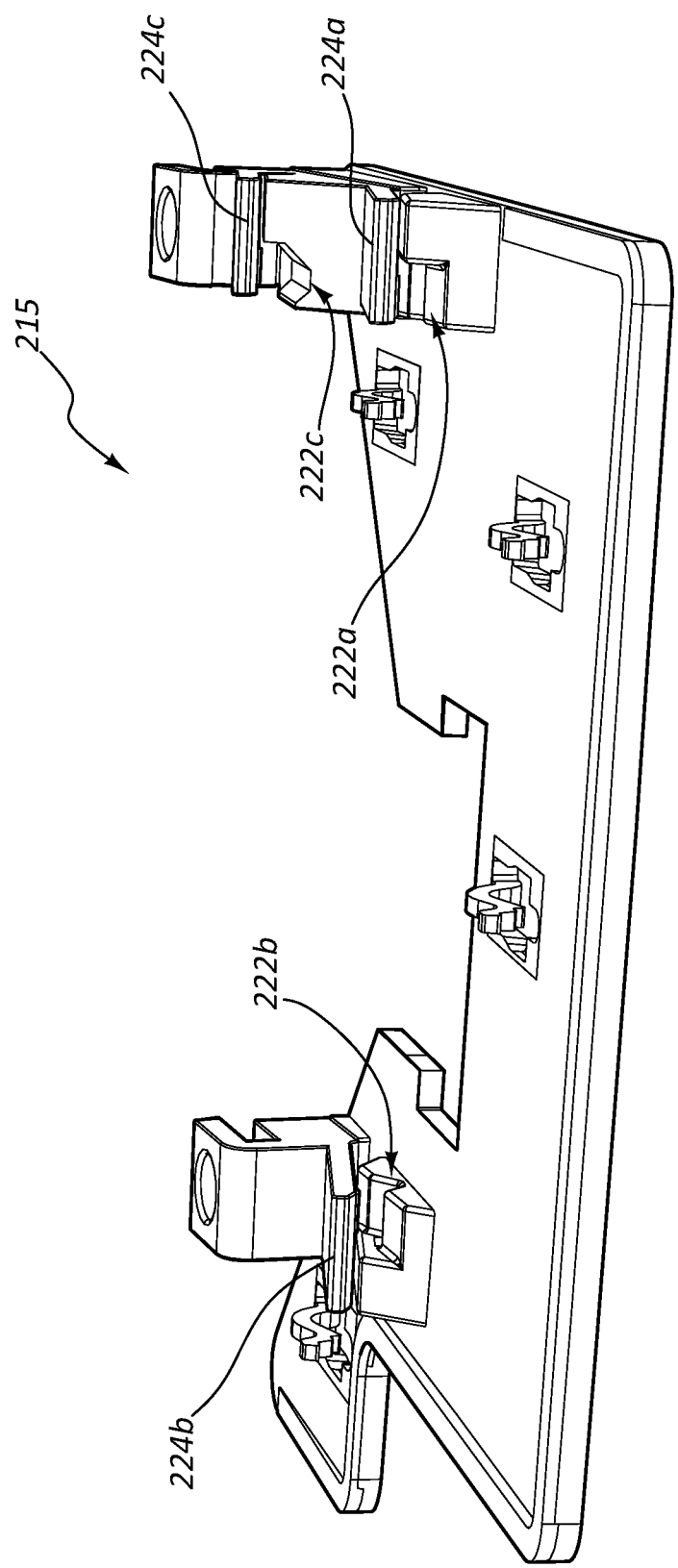
FIG. 3 is a second perspective view of the mounting bracket of FIG. 2.

FIG. 3 is another perspective view of mounting bracket 215. As better shown in this figure, groove 222c may comprise a V-shaped groove that is rotated with respect to the other two grooves 222a and 222b. More particularly, in the depicted embodiment, groove 222c is rotated by approximately ninety degrees relative to the other two grooves. Again, it is preferred that groove 222c, along with grooves 222a and 222b, be configured so as to contact a corresponding spherical or otherwise curved surface of a coupling member that may extend from or otherwise be coupled to a camera and/or camera housing, at precisely two spots (one on each surface of the flattened surfaces defining the V shape). By rotating one of the three grooves 222 in this manner, translational motion may be constrained along two perpendicular planes.

Figure 4:
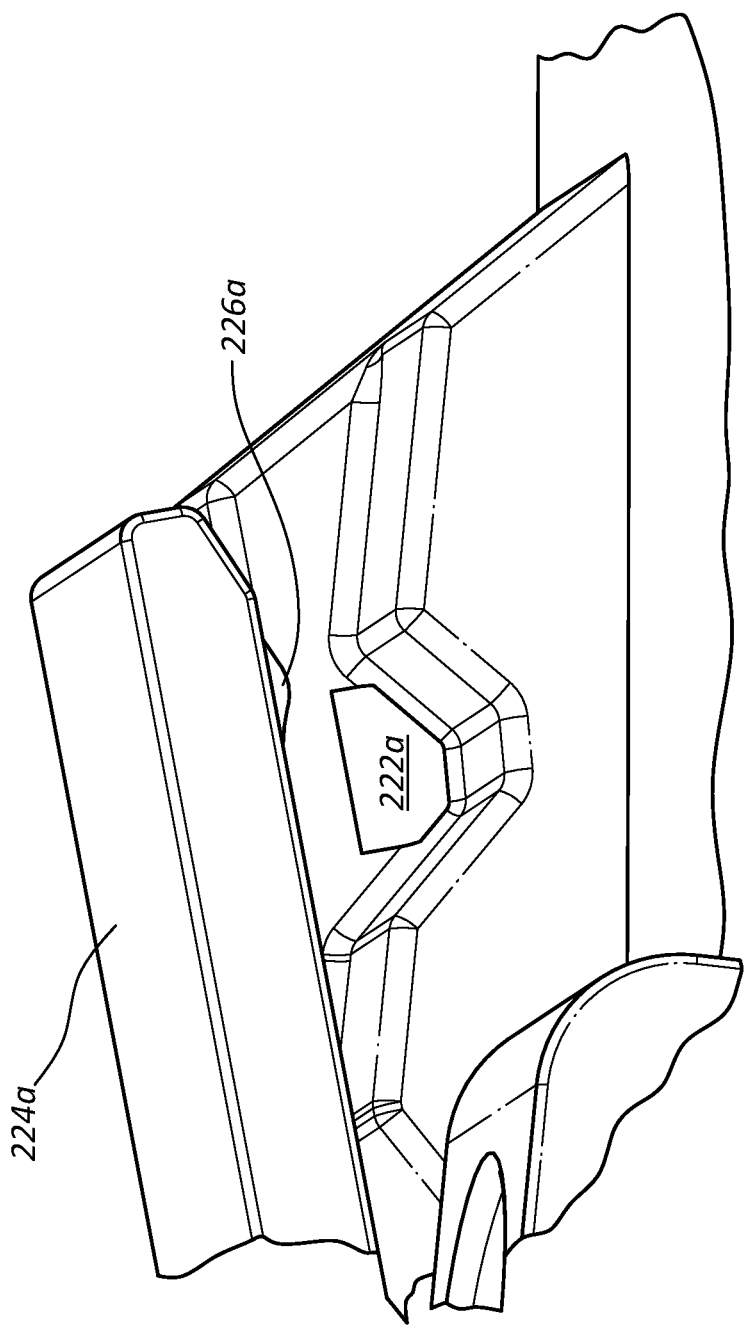
FIG. 4 is a close-up, perspective view of a mounting clip of the embodiment of FIGS. 2 and 3.

FIG. 4 is a close-up view of one of the clips 225 of mounting bracket 215, namely, clip 225a. As shown in this figure, a stop feature comprising a protruding lip 226a may be formed on a lower surface of prong 224a. In some embodiments, lip 226a may comprise a rounded surface or otherwise comprise a surface without any sharp edges and/or points. This may facilitate a desired engagement and disengagement between the camera mounting interface and the bracket mounting interface such that this engagement and disengagement may be performed, preferably snap-fit and by hand, repeatedly without damaging the engaging components. As discussed below, in some embodiments, an upper surface of the coupling members configured to contact lip 226 and/or a lower surface of prong 224 may also be spherical, curved, and/or lack any sharp edges and/or points, again, in order to facilitate a repeated, preferably snap-fit, engagement and disengagement.

Figure 5A:
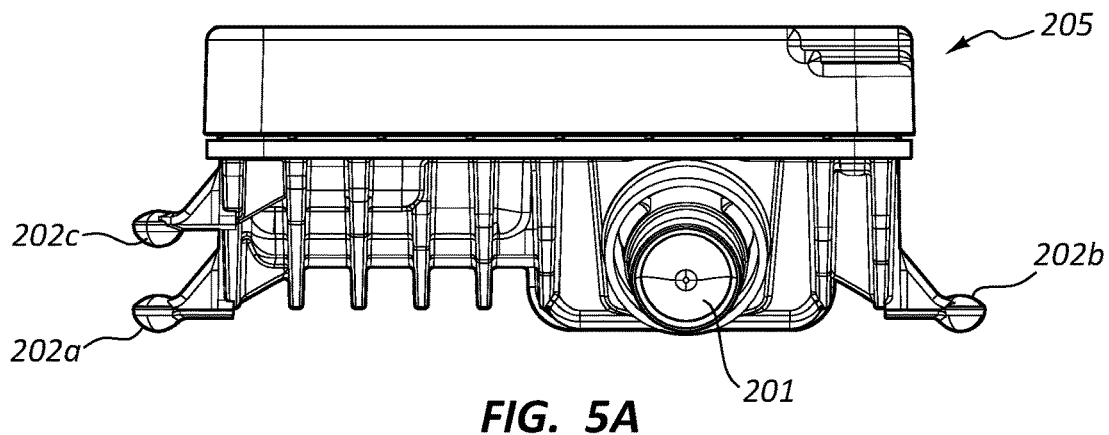
FIG. 5A is a first side elevation view of a vehicle camera assembly comprising a mounting interface according to some embodiments.
Figure 5B:
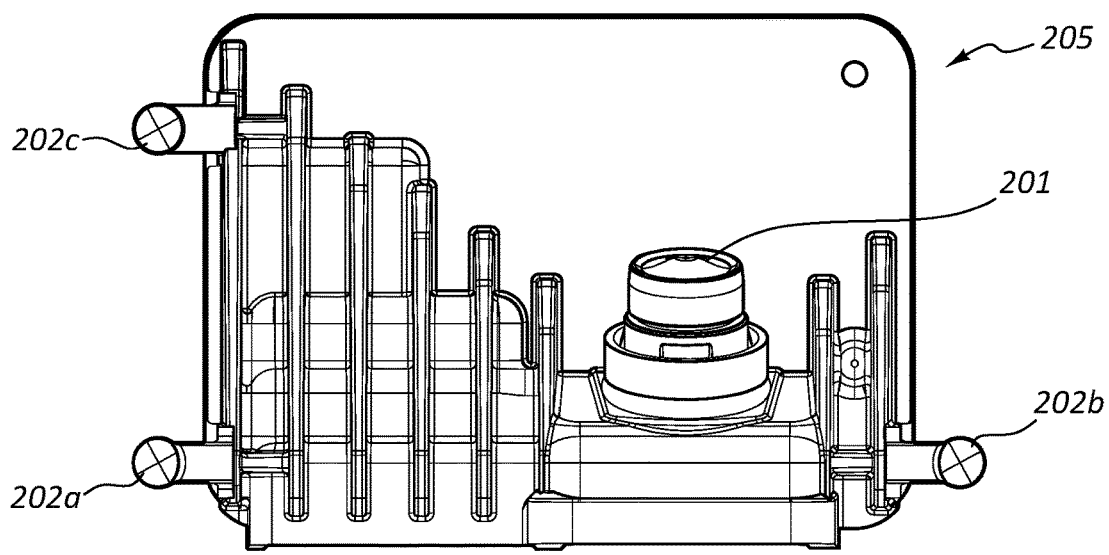
FIG. 5B is a plan view of the vehicle camera assembly of FIG. 5A.
Figure 5C:
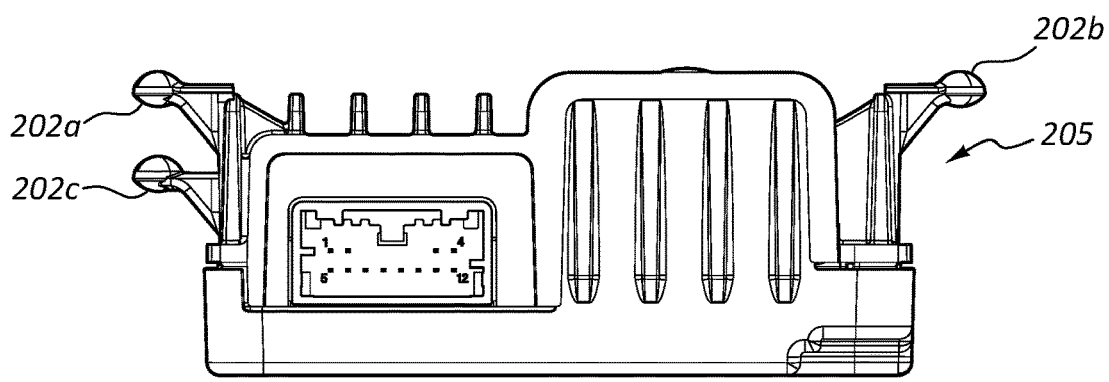
FIG. 5C a second side elevation view of the vehicle camera assembly of FIGS. 5A and 5B.

FIGS. 5A-5C depict various views of a camera assembly 205 comprising a camera 201, such as a visible light camera or infrared camera for use on a vehicle, or another component in need of being repeatedly mounted and unmounted from a vehicle, such as a RADAR sensor, LIDAR sensor, or the like. Camera assembly 205 may comprise a mounting interface defined at least in part by a plurality of coupling members, namely, coupling members 202a, 202b, and 202c. Each of the respective coupling members 202a, 202b, and 202c may extend beyond the periphery of the housing of camera assembly 205 so that, as previously alluded to and discussed below, they may be slid into various slots, clips, grooves, and/or other features defined by a mounting interface on a mounting bracket, such as mounting bracket 215 of FIGS. 2 and 3.

Figure 6:
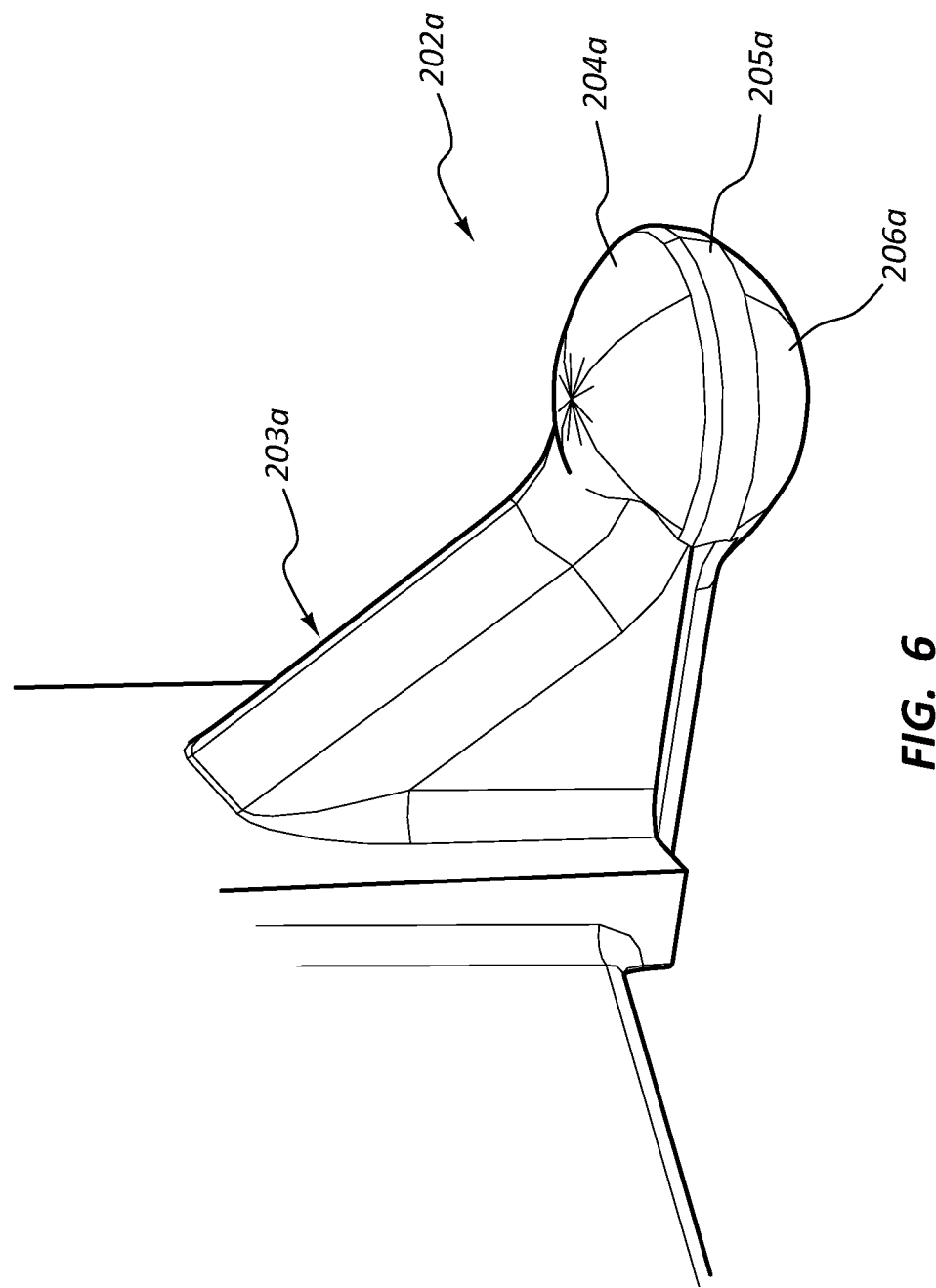
FIG. 6 is a close-up view of a protruding coupling member of the vehicle camera assembly of FIGS. 5A-5C.

As best shown in the close-up view of FIG. 6, preferably each of the various coupling members 202, such as coupling member 202a of FIG. 6, comprises a first (lower in the depicted embodiment) surface 206a defining a curved surface in two perpendicular planes or, more particularly, a spherical surface 206a or, in other embodiments, an ovoid surface or the like. In some embodiments, another surface positioned on an opposite end of surface 206 may also comprise a curved surface 204a. Similarly, in some such embodiments, curved surface 204a may be curved in two perpendicular planes or, more preferably, a second spherical surface 204a, or an ovoid surface or other suitably curved surface.

A bulbous region of coupling member 202a (and, in some embodiments, each of the other coupling members 202) may protrude from an arm 203a that may extend from a housing of camera assembly 205. In the depicted embodiment, arm 203a narrows from a base portion immediately adjacent to the housing to the bulbous region defined by surfaces 204a, 207a, and 206a.

Although it is contemplated that, in some embodiments, surfaces 204a and 206a may be sub-sets of a single spherical surface defining both surfaces, in the depicted embodiment, surfaces 204a and 206a are separated by a flat surface (at least in one dimension) 207a. Surface 207a may be curved in a second dimension normal to the first dimension referenced (curved along a plane extending parallel to a lower surface of arm 203a).

Figure 7:
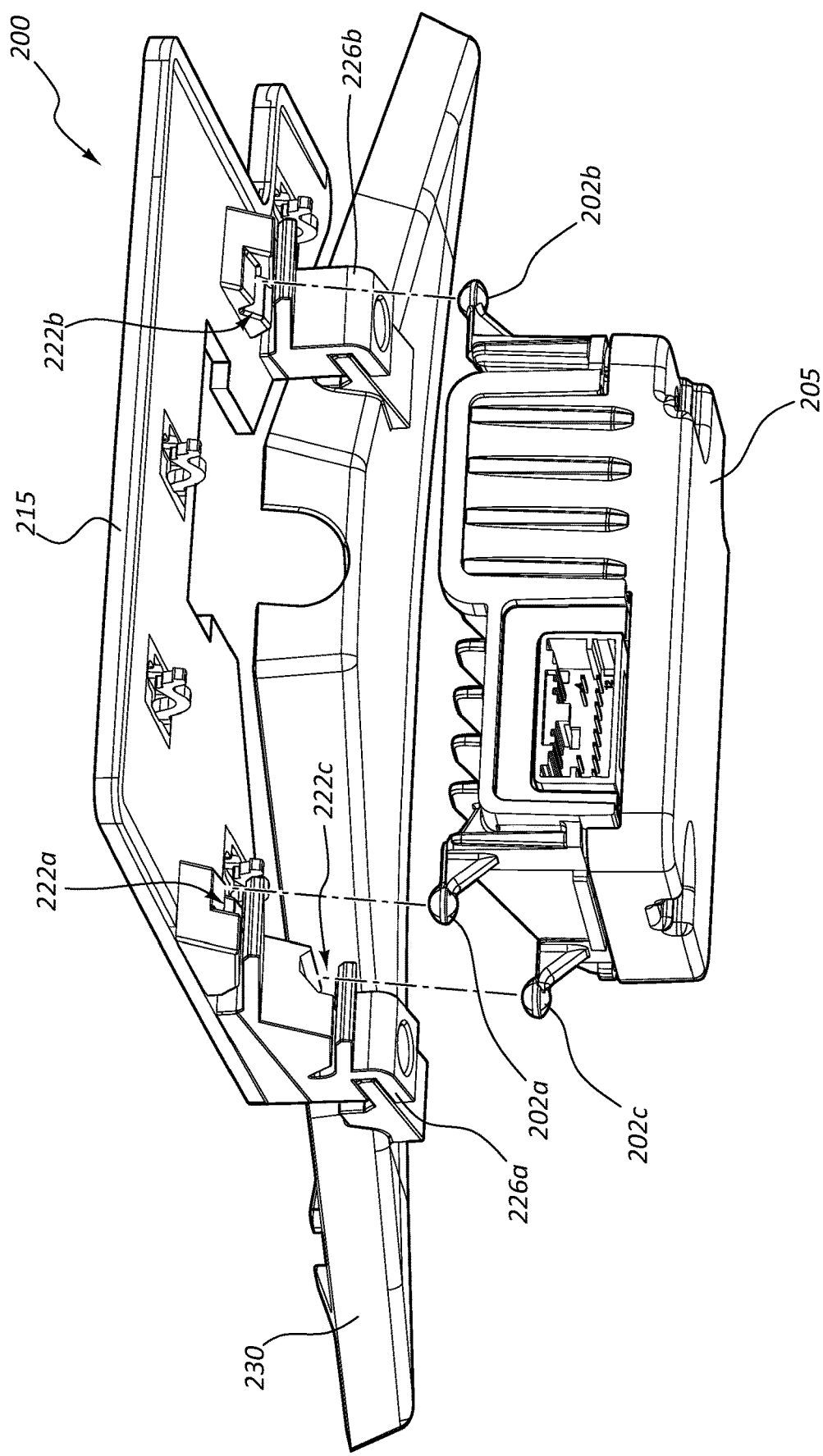
FIG. 7 is a perspective view of a vehicle camera assembly being mounted to a mounting interface of a mounting bracket according to some embodiments.
Figure 8:
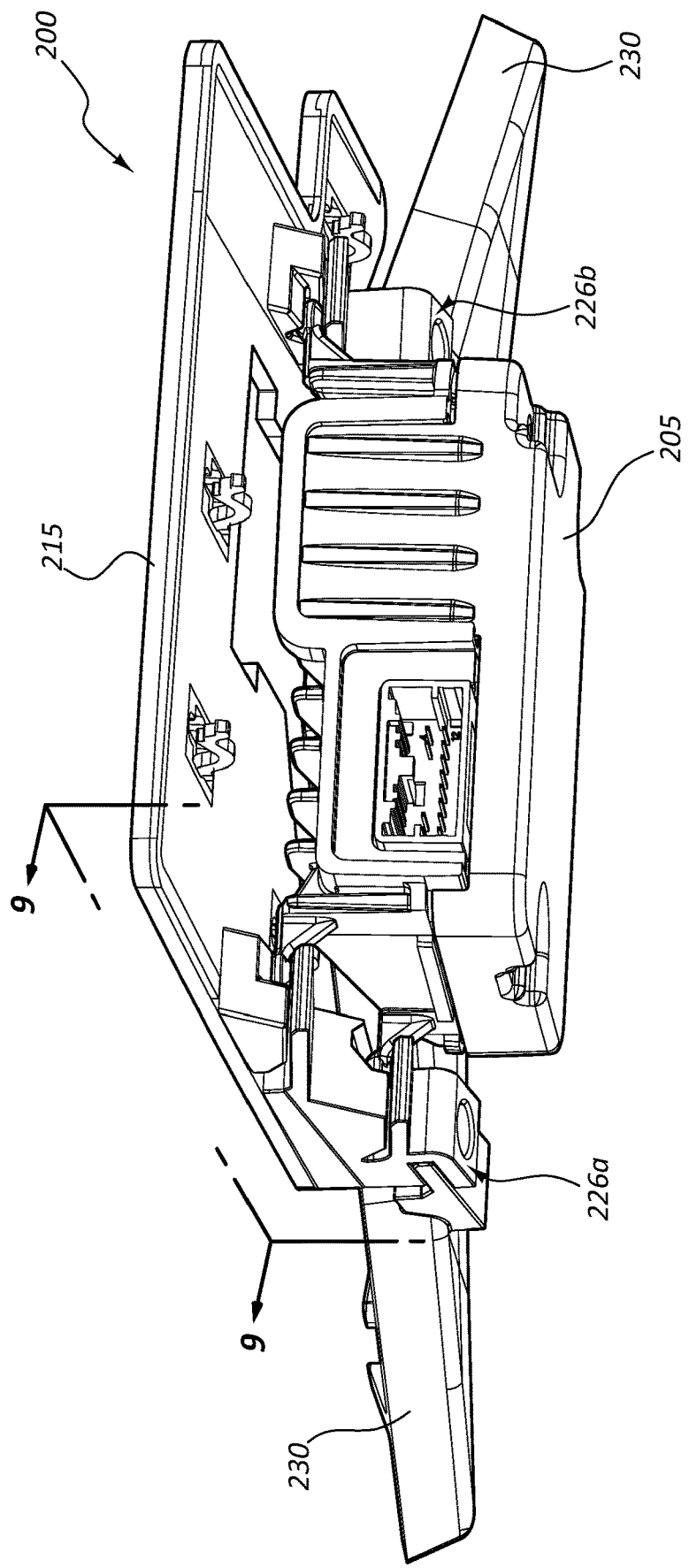
FIG. 8 is a perspective view of the assembly of FIG. 7 following mounting of the vehicle camera assembly to the mounting bracket.

FIG. 7 depicts a vehicle camera assembly 200 comprising mounting bracket 215 coupled with a light trap or light baffle 230 and further comprising camera assembly 205 in the process of being mounted to mounting bracket 215. As shown by the dashed lines in this figure, each of the various coupling members, namely, coupling members 202a, 202b, and 202c, is inserted into its respective clip and/or slot defined in part by grooves 222a, 222b, and 222c, respectively. As previously mentioned, the inventive features disclosed herein may, in some embodiments, allow for such a coupling without use of any specialized tools (or, in some such embodiments, any tools at all) and preferably in a snap-fit manner having a desired insertion force and retention force in order to keep camera assembly 205 in place during operation but allow an operator or technician to remove camera assembly 205 and re-mount camera assembly 205 by use of manual force in a particular direction. FIG. 8 depicts vehicle camera assembly 200 following completion of the mounting process.

Figure 9:
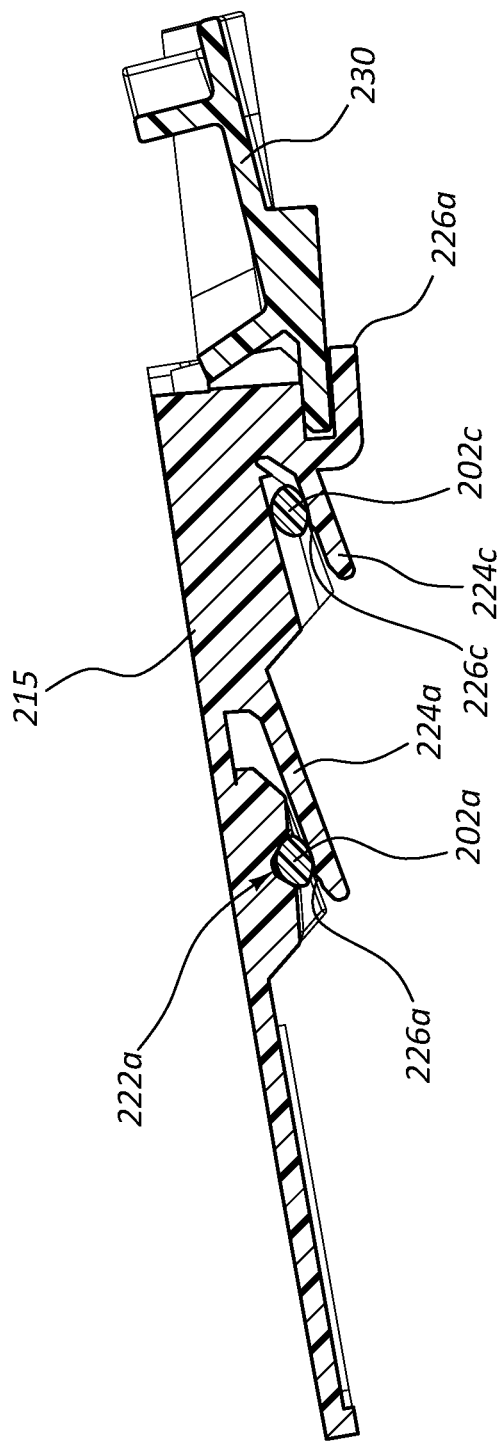
FIG. 9 is a cross-sectional view taken along line 9-9 in FIG. 8.

FIG. 9 is a cross-sectional view of vehicle camera assembly 200 taken along line 9-9 in FIG. 8. As shown in this figure, coupling members 202a and 202c (and, although not shown in FIG. 9, coupling member 202b), is positioned within its respective slot defined by prongs/plates 224a/224c and grooves 222a/222c, respectively. In addition, small lips 226a and 226c can be seen extending from a lower surface of prongs/plates 224a and 224c, respectively. As previously mentioned, these lips 226, or similar stops or other features, may be used to increase the amount of force required to mount and/or dismount camera assembly 205, as needed. As also shown in FIG. 9, providing a spherical or otherwise curved upper surface, preferably along with a smooth lower surface of prongs/plates 224a/224c and/or smooth lip 226a/226c, may increase the number of times with which the camera may be mounted and dismounted and may also be used to adjust the required mounting/dismounting force as desired.

Although spherical surfaces may be preferred, particularly for the lower surface of the bulbous portions of coupling members 202, as shown in FIG. 9, in some embodiments, use of other curved surfaces, such as ovoid surfaces, may be used. Similarly, it is contemplated that still other types of surfaces may be used that provide for two point contacts between each coupling member and its corresponding groove. Other types of grooves shapes may similarly be used. Again, preferably such other groove shapes, such as U-shaped grooves or other groove shapes, may still provide for two and only two points of contact with the corresponding coupling member.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A vehicle camera assembly, comprising:
   a camera configured for being coupled to a vehicle;
   a bracket configured for being coupled with the camera;
   a camera mounting interface positioned on the camera; and
   a bracket mounting interface positioned on the bracket,
      wherein at least one of the bracket mounting interface and the camera mounting interface comprises a plurality of protruding coupling members,
      wherein at least one of the camera mounting interface and the bracket mounting interface comprises a plurality of clips configured to releasably receive the plurality of protruding coupling members to releasably couple the camera to the bracket, and
      wherein at least a portion of each of the protruding coupling members defines, at least in part, an at least substantially spherical surface.

2. The vehicle camera assembly of claim 1, wherein the camera mounting interface comprises the plurality of protruding coupling members, and wherein the bracket mounting interface comprises the plurality of clips.

3. The vehicle camera assembly of claim 1, wherein each of the plurality of protruding coupling members comprises a first hemispherical surface, wherein each of the plurality of clips comprises a groove defining opposing flat surfaces, and wherein each groove is configured to receive a respective protruding coupling member so as to result in contact between the at least substantially spherical surface and the two opposing flat surfaces.

4. The vehicle camera assembly of claim 3, wherein each of the grooves comprises a V-shaped groove.

5. The vehicle camera assembly of claim 4, wherein each of the plurality of clips further comprises a resiliently deformable prong positioned opposite from the V-shaped groove such that a slot for receiving a protruding coupling member is formed between the resiliently deformable prong and the V-shaped groove.

6. The vehicle camera assembly of claim 5, wherein each of the resiliently deformable prongs comprises a protruding lip configured to lock a protruding coupling member within the slot.

7. The vehicle camera assembly of claim 6, wherein each of the protruding coupling members further comprises a second hemispherical surface, and wherein the second hemispherical surface is configured to contact the protruding lip as the protruding coupling member is disengaged from the slot.

8. The vehicle camera assembly of claim 1, wherein each of the plurality of clips comprises a groove and a resiliently deformable prong positioned opposite from the groove, and wherein each of the plurality of clips is wholly defined on either the camera or the bracket.

9. A vehicle camera assembly, comprising:
   a camera housing configured for being mounted to a vehicle;
   a plurality of protruding coupling members extending from the camera housing, wherein each of the plurality of protruding coupling members comprises a curved surface defining curves in two planes perpendicular to one another, wherein the curved surface comprises an at least substantially spherical surface; and
   a bracket configured for being coupled with the camera housing, wherein the bracket comprises a plurality of clips configured to releasably receive the plurality of protruding coupling members to releasably couple the camera housing to the bracket.

10. The vehicle camera assembly of claim 9, wherein the curved surface comprises a hemispherical surface.

11. The vehicle camera assembly of claim 9, wherein each of the plurality of clips comprises a groove configured to receive a respective protruding coupling member such that the curved surface of the respective protruding coupling member contacts the groove.

12. The vehicle camera assembly of claim 11, wherein the groove comprises a V-shaped groove.

13. The vehicle camera assembly of claim 12, wherein each of the plurality of clips further comprises a plate positioned opposite from the groove so as to define a slot for receiving a protruding coupling member therein.

14. The vehicle camera assembly of claim 13, wherein the plate comprises a resiliently-deformable plate configured to allow a protruding coupling member to deform the plate to allow the protruding coupling member to be received in the slot in a snap-fit manner.

15. The vehicle camera assembly of claim 14, wherein the plate comprises a protruding lip configured to lock a protruding coupling member in a slot defined by the plate and a groove.

16. A vehicle camera assembly, comprising:
   a camera configured for being coupled to a vehicle;
   a bracket configured for being coupled with the camera;
   a camera mounting interface positioned on the camera; and
   a bracket mounting interface positioned on the bracket,
      wherein at least one of the bracket mounting interface and the camera mounting interface comprises three coupling members,
      wherein each of the three coupling members comprises an at least substantially spherical surface,
      wherein at least one of the camera mounting interface and the bracket mounting interface comprises a plurality of clips configured to releasably receive the plurality of coupling members to releasably couple the camera to the bracket, and
      wherein the camera mounting interface and the bracket mounting interface are configured to constrain each of six degrees of freedom of movement of the camera relative to the bracket.

17. The vehicle camera assembly of claim 16, wherein the camera mounting interface and the bracket mounting interface are configured to provide for a snap-in configuration whereby the camera can be engaged to the bracket without use of specialized tools.

18. The vehicle camera assembly of claim 17, wherein the camera mounting interface and the bracket mounting interface are configured to provide for a snap-in configuration whereby the camera can be engaged to the bracket by hand and without use of any tools.

19. The vehicle camera assembly of claim 16, wherein each of the plurality of clips comprises a V-shaped groove, and wherein the camera mounting interface and the bracket mounting interface are configured to provide exactly six points of contact between the at least substantially spherical surfaces of the coupling members and the V-shaped grooves of the clips.

* * * * *